(12) United States Patent
Felsenthal

(10) Patent No.: US 10,557,227 B2
(45) Date of Patent: Feb. 11, 2020

(54) DRYING RACK

(71) Applicant: Whitmor, Inc., Southaven, MS (US)

(72) Inventor: Sandy Felsenthal, Memphis, TN (US)

(73) Assignee: Whitmor, Inc., Southhaven, MS (US)

( * ) Notice: Subject to any disclaimer, the term of this patent is extended or adjusted under 35 U.S.C. 154(b) by 0 days.

(21) Appl. No.: 15/488,040

(22) Filed: Apr. 14, 2017

(65) Prior Publication Data

US 2018/0298547 A1    Oct. 18, 2018

(51) Int. Cl.
*D06F 57/08*    (2006.01)
*F16C 11/10*    (2006.01)

(52) U.S. Cl.
CPC .............. *D06F 57/08* (2013.01); *F16C 11/10* (2013.01)

(58) Field of Classification Search
CPC .......... D06F 57/08; F16C 11/10; F16C 11/04; F16C 11/03; F16M 11/041; F16M 11/10; F16M 13/022; F16M 13/00; F16M 2200/024; A47B 81/00; A47B 81/005; A47B 43/00
USPC ........................................ 248/292.12, 292.13
See application file for complete search history.

(56) References Cited

U.S. PATENT DOCUMENTS

| | | | | |
|---|---|---|---|---|
| 1,074,430 A | * | 9/1913 | Hill | A47B 23/042 211/195 |
| 2,003,844 A | * | 6/1935 | Tintner | A61G 1/013 403/97 |
| 4,086,980 A | * | 5/1978 | Shortes | E06C 1/10 182/151 |
| 4,270,872 A | * | 6/1981 | Kiyosawa | F16B 7/0446 403/170 |
| 4,376,470 A | * | 3/1983 | Ashton | E06C 1/22 182/207 |
| 4,383,486 A | * | 5/1983 | Reineman | A47B 9/00 108/10 |
| 4,543,007 A | * | 9/1985 | Quiogue | F21V 21/30 285/185 |
| 4,666,328 A | * | 5/1987 | Ryu | E06C 1/32 16/329 |
| 4,917,343 A | * | 4/1990 | Wainscott | A47B 23/06 248/284.1 |
| 4,951,780 A | * | 8/1990 | Kim | E04G 1/30 182/119 |
| 5,367,815 A | * | 11/1994 | Liou | A01K 97/10 248/514 |
| 6,129,179 A | * | 10/2000 | Rooney | E06C 1/38 182/156 |
| 6,220,389 B1 | * | 4/2001 | Krause | E06C 1/12 182/163 |

(Continued)

*Primary Examiner* — Ko H Chan
(74) *Attorney, Agent, or Firm* — Stites & Harbison PLLC; Richard S. Myers, Jr.

(57) ABSTRACT

A collapsible drying rack for drying wet garments is provided. The drying rack preferably includes a right and a left frame, with each frame including a top and a bottom leg. Crossbars on which garments may be hung connect the left and right frames to one another. The top and bottom legs of each frame are engaged to one another at a joint that that allows the legs to be placed at a variety of angles relative to one another. Each joint also may include a locking member that keeps the legs at a particular angle relative to one another, including a 0° angle so that the rack can be collapsed and compactly stored when not in use.

21 Claims, 8 Drawing Sheets

(56) References Cited

U.S. PATENT DOCUMENTS

| | | | | |
|---|---|---|---|---|
| 6,427,858 B2* | 8/2002 | Sabounjian | ............ | D06F 57/08 |
| | | | | 211/183 |
| 6,711,780 B2* | 3/2004 | Lee | ............ | E06C 1/32 |
| | | | | 16/326 |
| 6,857,503 B2* | 2/2005 | Simpson | ............ | E06C 1/18 |
| | | | | 182/178.3 |
| 7,523,904 B2* | 4/2009 | Carnevali | ............ | F16C 11/10 |
| | | | | 248/176.1 |
| 8,286,810 B2* | 10/2012 | Sabounjian | ............ | D06F 57/10 |
| | | | | 211/200 |
| 8,464,833 B2* | 6/2013 | Lee | ............ | E06C 1/12 |
| | | | | 182/207 |
| 9,062,821 B2* | 6/2015 | Jensen | ............ | F16M 11/041 |
| 9,399,882 B1* | 7/2016 | McGrath | ............ | E05D 11/1007 |
| 2006/0272895 A1* | 12/2006 | Lavoie | ............ | B60R 3/02 |
| | | | | 182/127 |
| 2014/0091194 A1* | 4/2014 | Miller | ............ | A47B 97/08 |
| | | | | 248/457 |

* cited by examiner

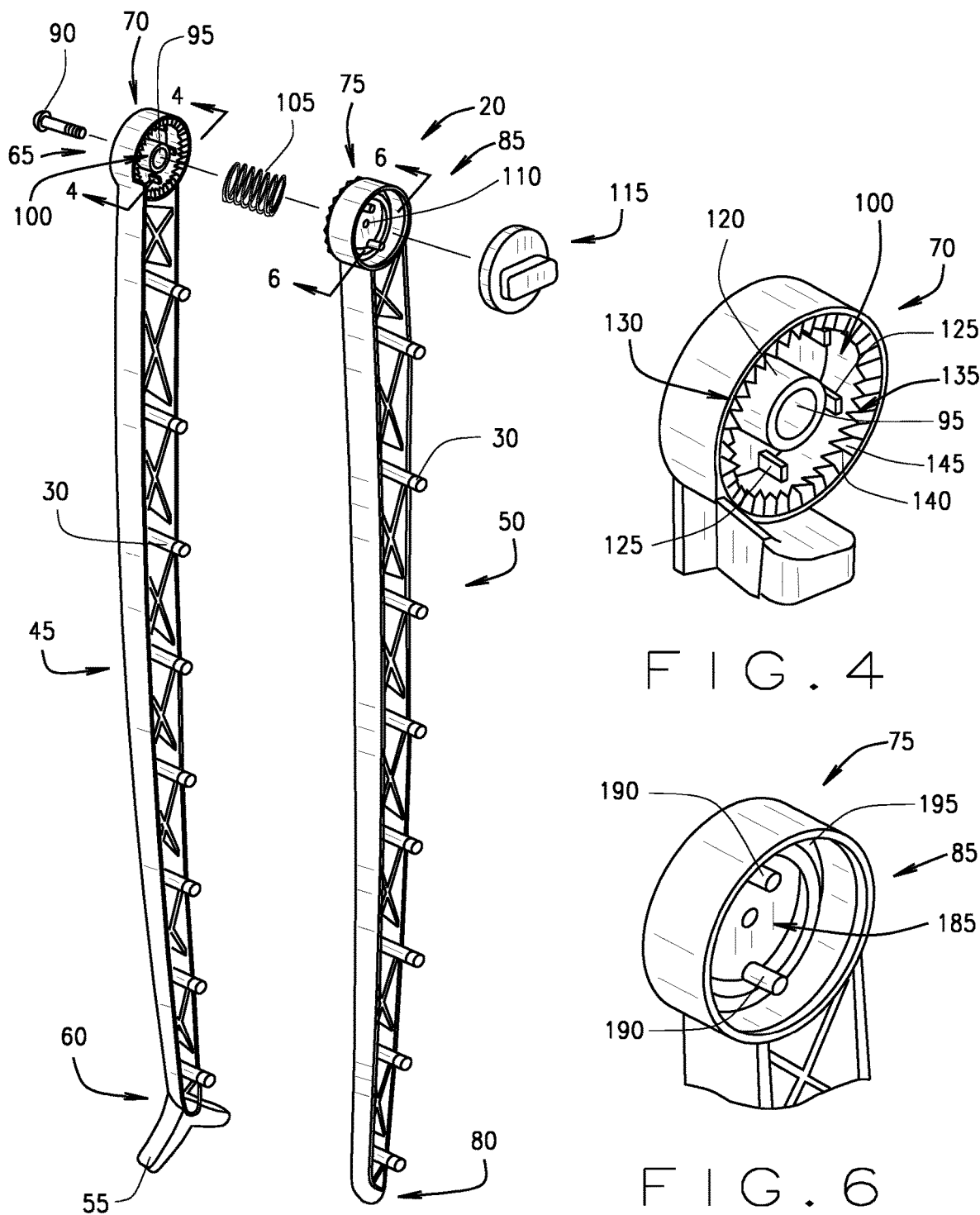

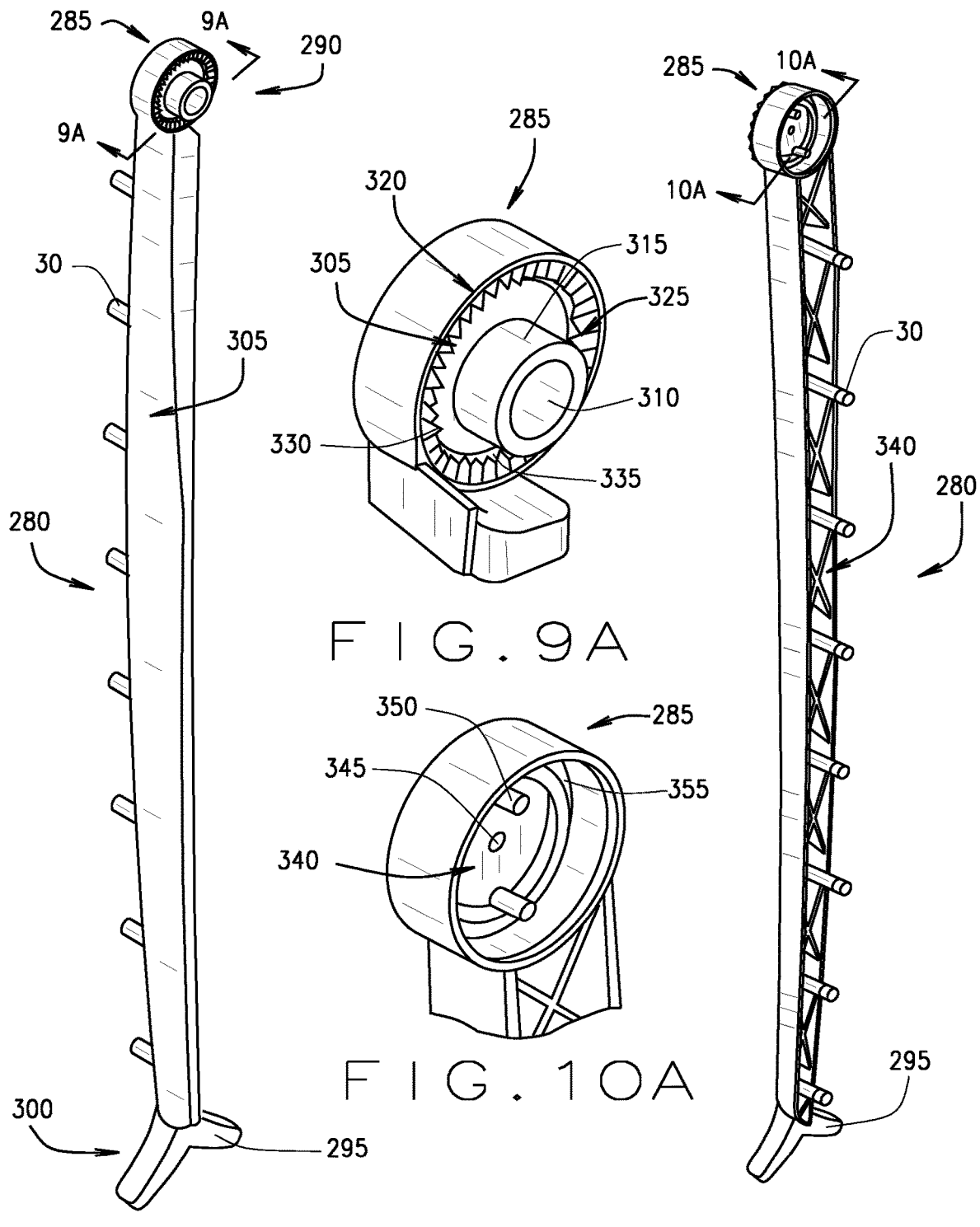

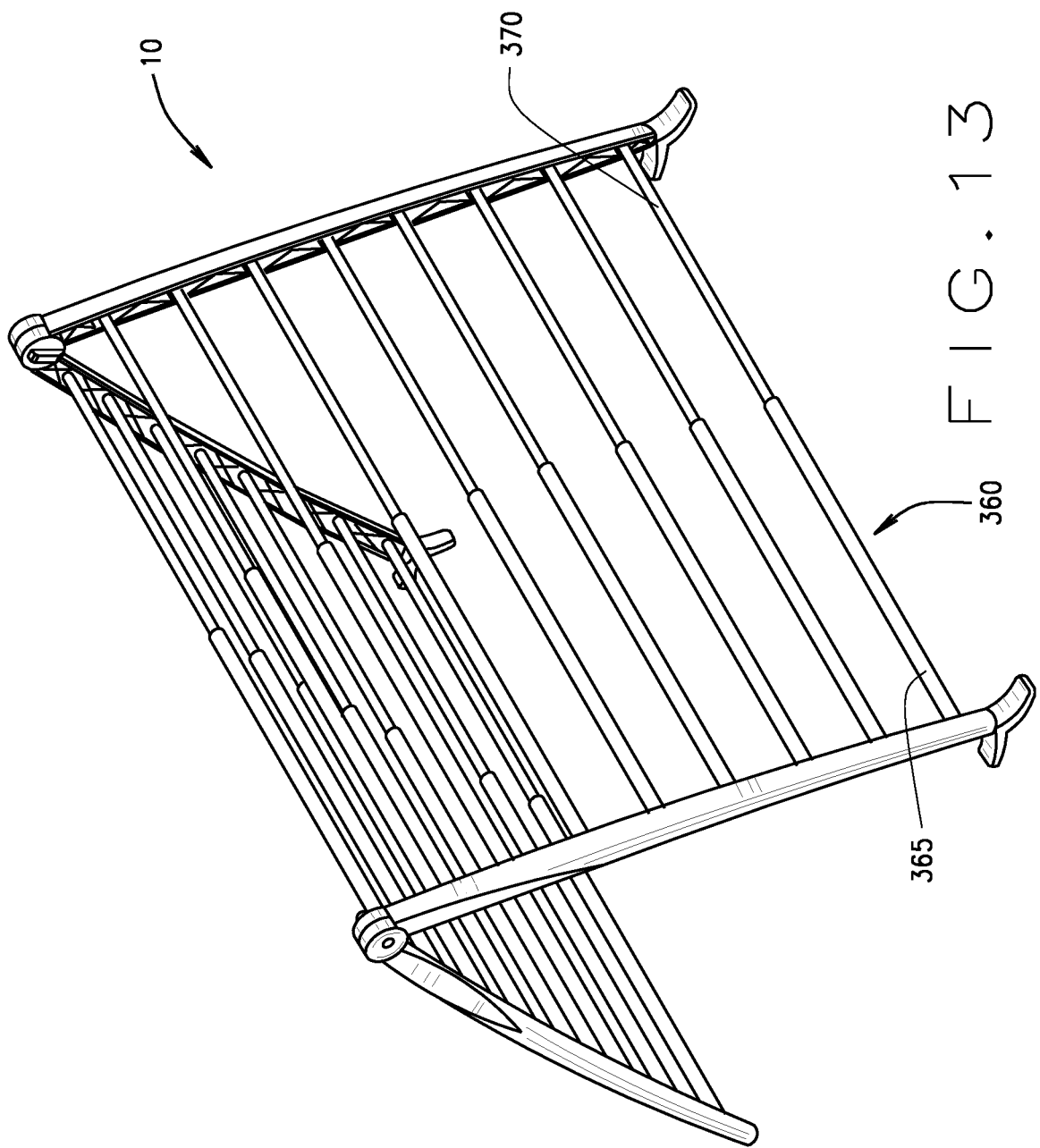

DRYING RACK

BACKGROUND OF THE INVENTION

The present invention relates generally to drying wet garments. More particularly, the present invention relates to a garment drying rack that is foldable to a compact form so that it takes up a small space when not in use.

Due to the sensitive materials often used in garments, many garments require that they be "line-dried" instead of dried in drying machines. Thus, many people have a need for a portable drying rack on which wet clothes are hung for drying. Such a rack is often used indoors in living spaces such as an apartment or condominium. However, such living spaces may lack adequate storage space. Thus, a drying rack that takes up minimal space not only when stored, but also when in use is desirable. However, the unit must be stable to use and also easily portable. That way, the drying rack may be conveniently moved from use in one area to another area and should fold conveniently for storage in a small area.

Moreover, existing garment drying racks that are collapsible to take up less space often are generally smaller in size once expanded. Those drying racks likely do not have sufficient rack space to dry several garments at once, especially when a larger load needs to be dried. Thus, a need exists for a drying rack that substantially expands relative to its compact size so that it can accommodate a large load of garments.

SUMMARY OF THE INVENTION

A garment drying rack is provided for drying wet garments. The drying rack is foldable such that it can be stored in a small storage space when not in use. The drying rack also preferably is configured so that it may efficiently use space when deployed for use as a drying rack. Moreover, in at least one embodiment, the drying rack is further expandable after it has been unfolded to accommodate especially large loads of garments.

More particularly, the drying rack generally preferably includes each of a left frame and a right frame. The left and right frames may be engaged with one another by a plurality of parallel crossbars on which wet garments may be hung to dry. The crossbars may be attached to the left and right frames in a variety of manners including a friction fit or a screw system. The left and right frames are preferably each made up of a top leg and a bottom leg. The proximal portions of the top and bottom legs each include joint members that are fastenable with one another to also fasten the top and bottom legs to one another at their proximal portions.

The joint members also preferably include a gearing or teeth mechanism to allow the joint members to rotate relative to one another, thus also allowing the top and bottom legs to rotate relative to one another. A locking member may also be engaged with one of the joint members of either the top or bottom leg (at each of the left and right frame) to keep the top and bottom legs at a particular angle of rotation relative to one another when the rack is in use. The locking member may also be used to release the gearing or teeth mechanism to allow a user to collapse the drying rack when not in use. The joint members and locking members also preferably include stopper members that help to ensure that the angle between the top and bottom legs of the left and right frames remains between 0° and 180°.

In at least one alternative embodiment, the crossbars that connect the right frame to the left frame are able to telescope. The telescoping crossbars may allow the crossbars to increase their length depending on the size of the load to be dried. However, the crossbars can also be shortened when the drying rack is not in use and is going to be stored.

BRIEF DESCRIPTION OF THE DRAWINGS

FIG. 3 is an exploded view of a left bottom and a left top leg of the garment drying rack of FIG. 1.

FIG. 4 is an enlarged view of a portion of the left bottom leg of FIG. 3 taken across line 4-4.

FIG. 6 is an enlarged view of a portion of the left top leg of FIG. 3 taken across line 6-6.

FIG. 9 is a perspective view of an outer portion of a right bottom leg.

FIG. 9A is an enlarged view of a portion of the right bottom leg of FIG. 9 taken across line 9A-9A.

FIG. 10 is a perspective view of an inner portion of a right bottom leg.

FIG. 10A is an enlarged view of a portion of the right bottom leg of FIG. 10 taken across line 10A-10A.

FIG. 13 illustrates a perspective view of a garment drying rack in accordance with a second embodiment of the present disclosure.

DETAILED DESCRIPTION OF THE INVENTION

Figure 1:
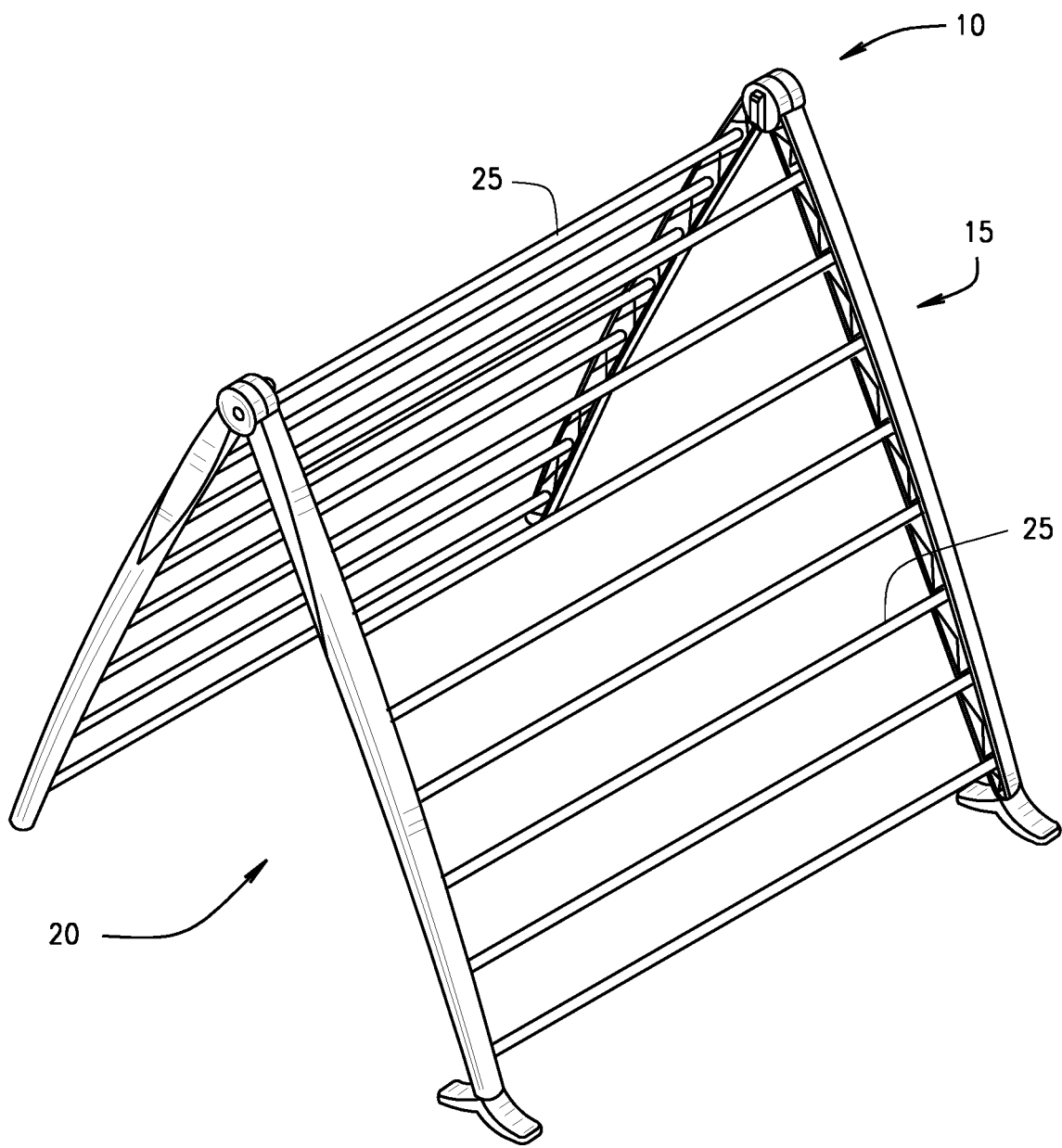
FIG. 1 is a perspective view of a garment drying rack in accordance with an embodiment of the present disclosure.

Referring to the drawings more particularly by reference numbers wherein like numbers refer to like parts, FIG. 1 illustrates a garment drying rack (or simply referred to hereinafter as "drying rack") 10. Wet garments may be draped on the drying rack 10 in a manner known in the art to allow the garments to dry without having to put them in a clothes dryer, or drying machine.

The drying rack 10 preferably includes a right frame 15 and a left frame 20. The right and left frames 15, 20 may be attached to one another by a plurality of crossbars 25. The crossbars 25 are preferably substantially perpendicular to the right and left frames 15, 20. As shown, the crossbars 25 are preferably positioned and located at a distance from one another that allows various garments to be placed on the crossbars 25 without touching one another while they dry. This distance is known and understood in the art.

Figure 2:
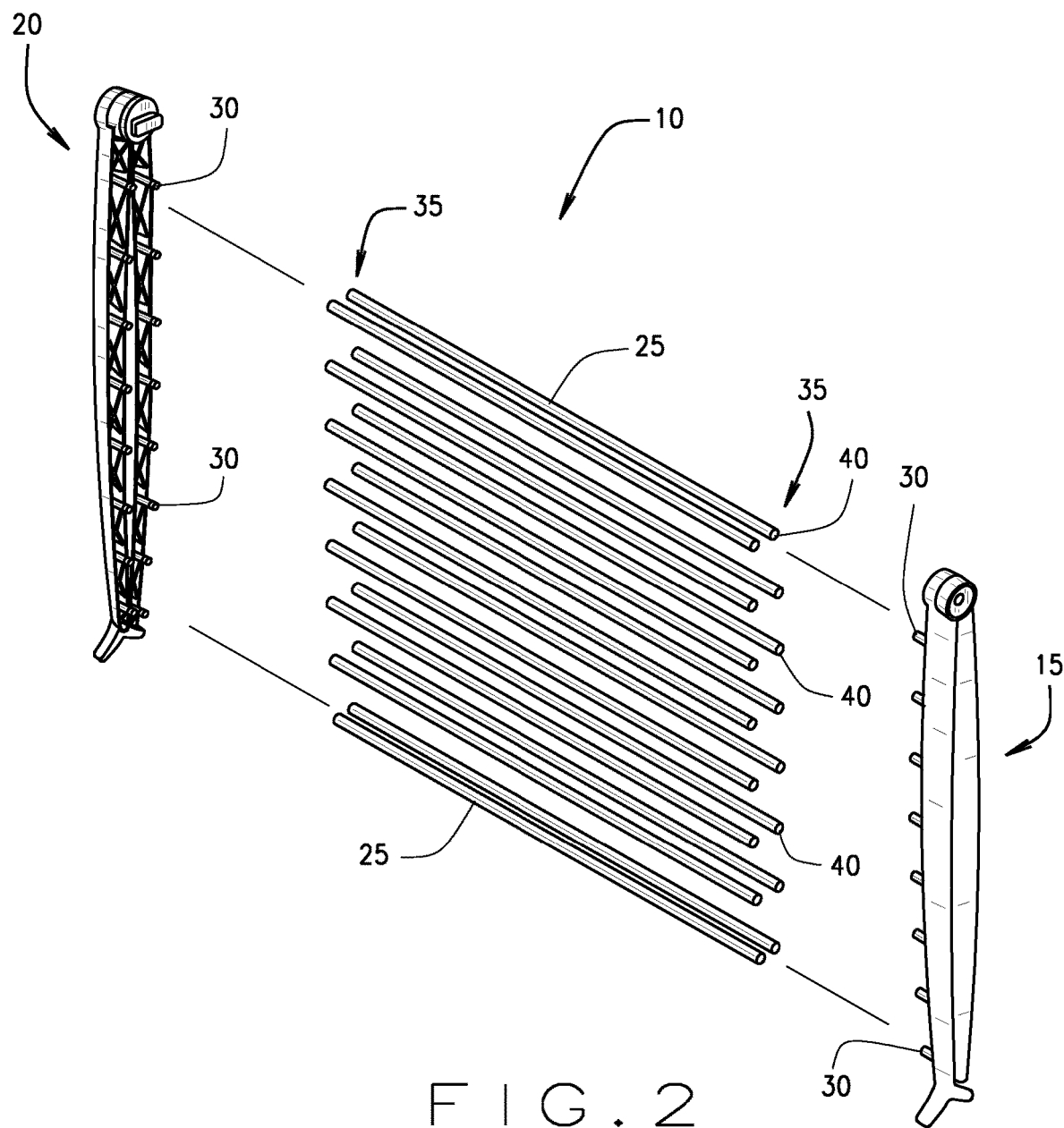
FIG. 2 is an exploded view of the garment drying rack of FIG. 1.

Turning to FIG. 2, the crossbars 25 are preferably releasably attachable with the right and left frames 15, 20 using a projection and aperture system described below. More particularly, each of the legs (described below) that make up the right and left frames 15, 20 may include a plurality of projection members 30 that project inwardly from the right and left frames 15, 20. The projections 30 are preferably spaced apart at the above-described distance that allows for clothes to be placed on the crossbars 25 at a distance far enough from one another that the garments do not overlap or touch while drying.

The crossbars 25 shown and illustrated in FIGS. 1 and 2 are preferably substantially cylindrical tube structures having end portions 35 for selective mating with the projections 30 of the right and left frames 15, 20. More particularly, apertures 40 are positioned and located at the end portions 35 of the crossbars 25. Those apertures 40 preferably have a circumference only slightly larger than the circumference of the projections 30. Thus, when the apertures 40 receive the projections 30, the projections 30 are snugly and securely engaged within the apertures 40. In the illustrated embodiment, the crossbars 25 and the right and left frames 15, 20 are attached using the projection and aperture system described, but in alternative embodiments the crossbars 25 may be releasably attached to the right and left frames 15, 20 using means known or foreseeable in the art such as a bolt and nut system, screw system, or the like.

Figure 11:
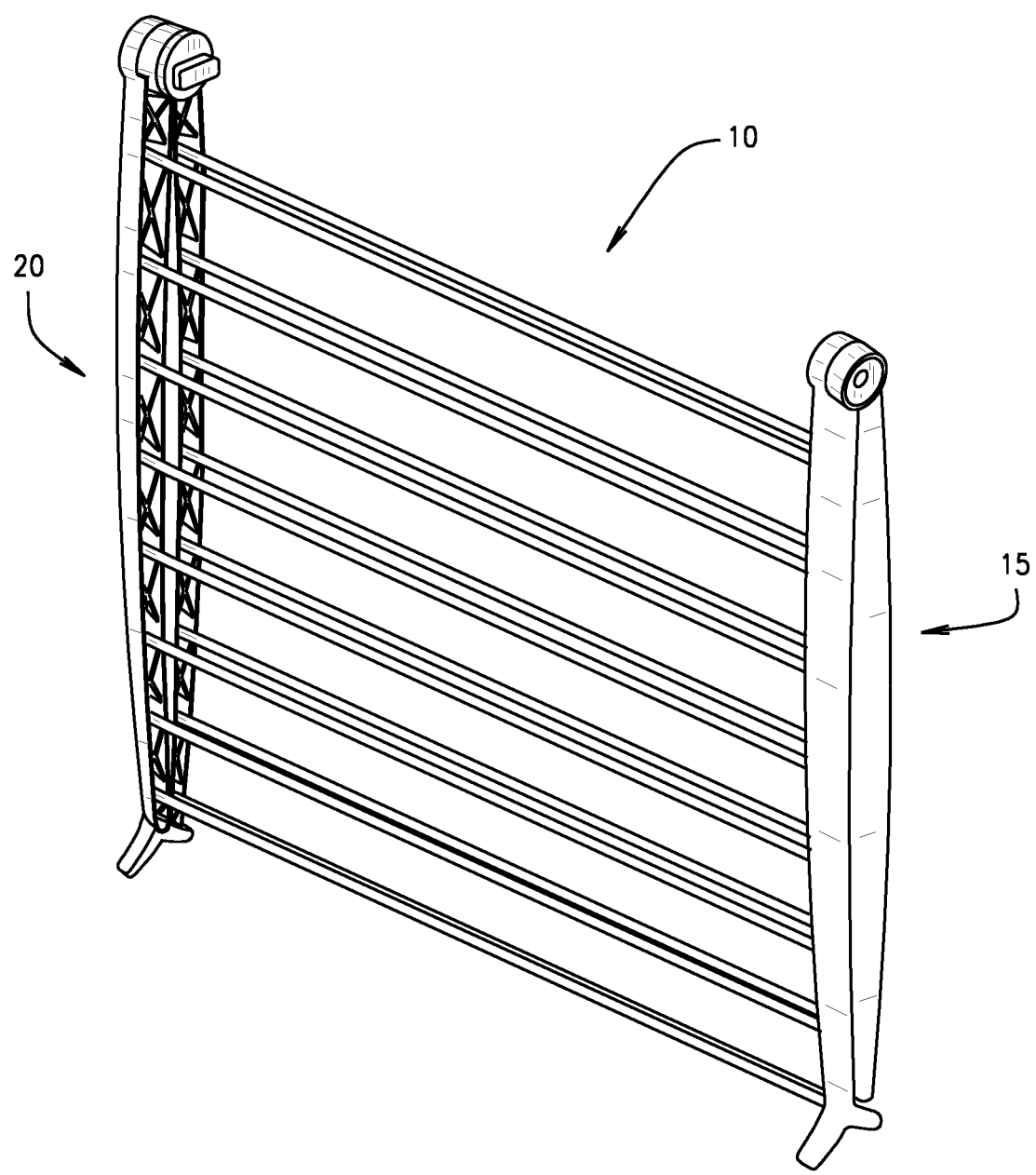
FIG. 11 is a perspective view of an assembled garment drying rack in a closed position.
Figure 12:
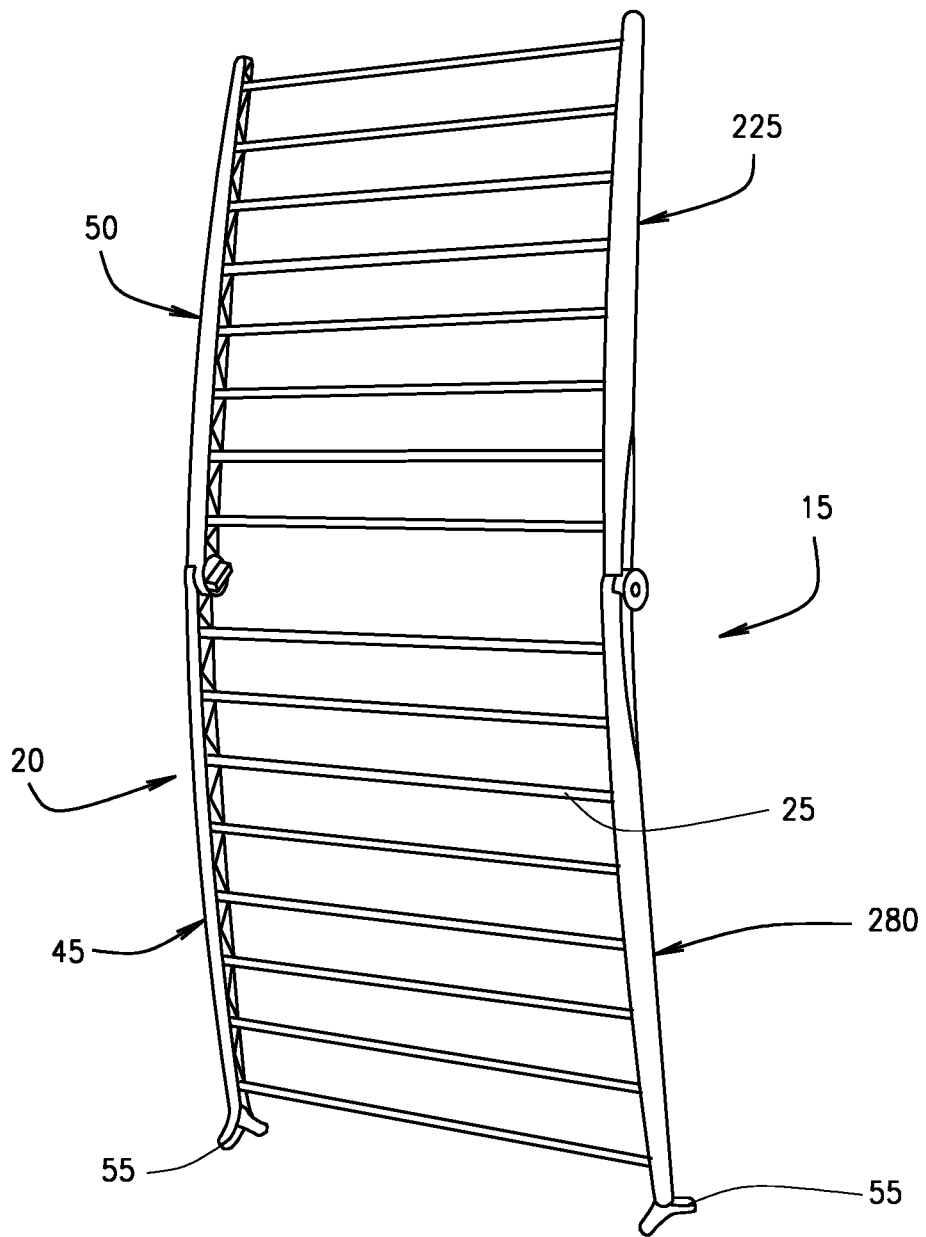
FIG. 12 is a perspective view of an assembled garment drying rack in an open, extended position.

The left frame 20 is illustrated in greater detail in FIG. 3. The left frame 20, like the right frame 15 (shown in FIGS. 8-10) generally comprises a bottom leg and a top leg, bottom leg 45 and top leg 50. Each of the bottom leg 45 and the top leg 50 may include the above-described projections 30 that project inwardly for selective mating with the crossbars 25 (not illustrated in FIG. 3). As shown in FIG. 3, the bottom leg 45 preferably includes feet 55 integrally formed with the bottom leg 45 at a distal portion 60 of the bottom leg 45. The feet 55 preferably help stabilize the drying rack 10 when in use as shown in FIG. 1 (or when in collapsed form as shown in FIG. 11 or extended form as shown in FIG. 12).

A proximal portion 65 of the bottom leg 45 preferably includes a round or circle-shaped joint member 70 which is releasably attachable to a joint member 75 of the top leg 50 in a manner described in greater detail in a method described and shown in greater detail below. As shown in FIG. 3, the bottom leg 45 may be shaped so that it that bows outwardly from its distal portion 60 to its proximal portion 65. On the other hand, the top leg 50 may be shaped so that it bows in a substantially opposite outward direction as the bottom leg 45 from its distal portion 80 to its proximal portion 85. These particular shapes may also help to stabilize the drying rack 10 when it is in the deployed position shown and illustrated in FIG. 1.

At a high level, the bottom leg 45 and the top leg 50 are preferably attached at their joint members 70, 75, respectively, using a screw system. More particularly, a screw 90 may be inserted through an aperture 95 of the bottom leg 45 at an interior side 100 of the bottom leg 45. After the screw 90 has been inserted through the aperture 95, it may further be inserted through a spring 105 placed between the joint members 70, 75. The spring 105 may be used to create tension between the legs 45, 50 and their joint members 70, 75 when the legs 45, 50 are attached to one another in the manner described below. An additional aperture 110 is preferably provided in the joint member 75 for receiving the screw 90. After the screw 90 is received by the apertures 95 and 110, it is preferably received and secured within a lock member 115, the structure of which is described in greater detail below (See FIG. 7).

The interior side 100 of the joint member 70 is illustrated in greater detail in FIG. 4. The interior side 100 also may include a substantially cylindrical member 120 that surrounds the aperture 95, thus forming the aperture 95. The cylindrical member 120 projects outwardly from the interior side 100, and it preferably serves as a structure around which the spring 105 may be secured. To further retain the spring 105 in a specific location relative to the cylindrical member 120, the interior side 100 of the joint member 70 also preferably includes several projection members 125 that extend outwardly from the interior side 100. In the illustrated embodiment, three of six projection members 125 are shown, but in alternative embodiments more or fewer projection members 125 may be provided. The projection members 125 are preferably positioned and located at a particular radial distance from the cylindrical member 120. More particularly, the projection members 125 may be placed at a radial distance from the cylindrical member 120 that causes the projection members 125 to abut the spring 105 (and thus retain it within the interior side 100 of the joint member 70).

An outer circumference 130 of the interior side 100 of the joint member 70 also preferably includes a plurality of tooth members 135 that circumscribe the outer circumference 130. Each tooth member 135 preferably includes each of a peak 140 and a trough 145. The peaks 140 of the tooth members 135 are pointed portions of the tooth members 135 that engage troughs of tooth members of the joint member 75 when legs 45, 50 are engaged to one another, in a manner described below in greater detail. The peaks 140 are preferably oriented so that they do not point directly toward the cylindrical member 120, but instead in a counter-clockwise direction. The troughs 145 are preferably located between adjacent peaks 140 and are preferably positioned and located to receive the peaks on the receiver member 75, as discussed below.

Figure 5:
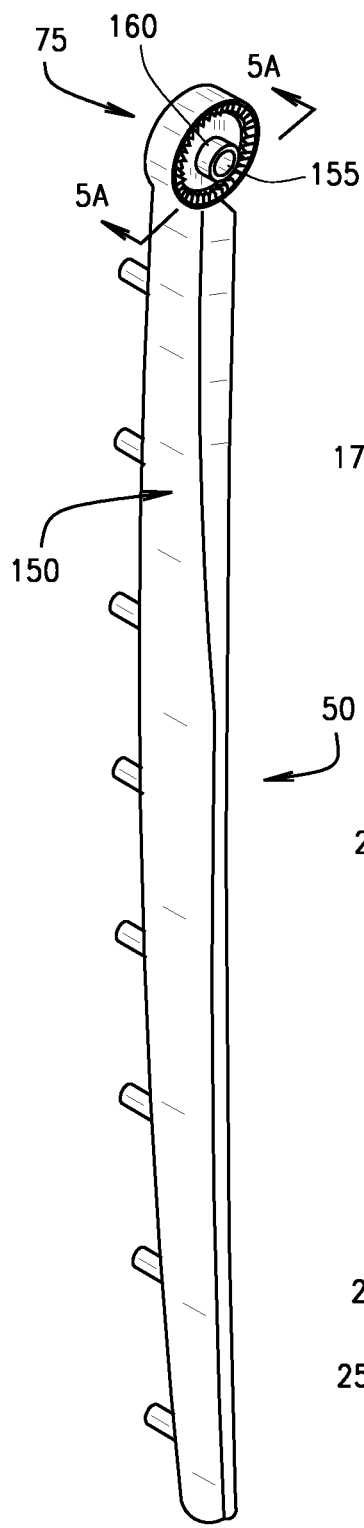
FIG. 5 is a perspective view of an outer portion of a left top leg.
Figure 5A:
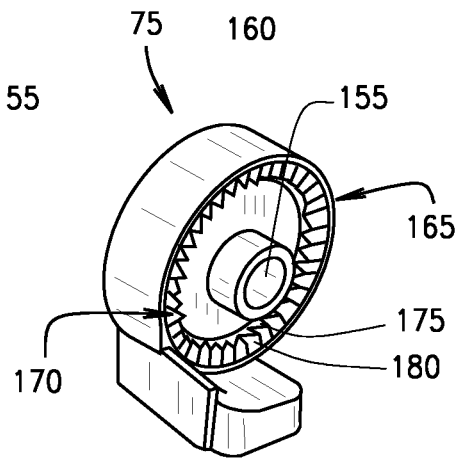
FIG. 5A is an enlarged view of a portion of the left top leg of FIG. 5 taken across line 5A-5A.

FIG. 5 provides a view of an exterior side 150 of the top leg 50. FIG. 5A, which is an enlarged view of the line 5A-5A in FIG. 5 shows the exterior side 150 of the joint member 75 of the top leg 50. The exterior side 150 of the joint member 75 is preferably configured to mate with the interior side 100 of the joint member 70. Thus, the exterior side 150 also includes an aperture 155 defined by a cylindrical member 160 that protrudes outwardly from the exterior side 150 and surrounds the aperture 155. The cylindrical member 160 preferably has a circumference just smaller than the circumference of the cylindrical member 120. Thus, when the joint members 70, 75 are mated with one another, the cylindrical member 160 is preferably "nested" within the cylindrical member 120 in a friction fit. As would be clear to one skilled in the art, the screw 90 (not shown in FIG. 5A) may enter the aperture 155 after exiting the aperture 95 and before exiting the aperture 110 on the opposite side of the joint member 75.

An outer circumference 165 of the exterior side 150 of the joint member 75 also preferably includes a plurality of tooth members 170. Like the tooth members 135, each tooth member 170 preferably includes each of a peak 175 and a trough 180. The peaks 175 and troughs 180 are substantially similar to the peaks 140 and troughs 145 of the tooth members 135. The peaks 175 are further illustrated in FIG. 5A in a counter-clockwise direction. However, when the joint members 70, 75 are mated, the interior side 100 of the joint member 70 preferably faces and abuts the exterior side 150 of the joint member 75. Thus, the peaks 140 and 175 face substantially opposite directions from one another when the joint members 70, 75 are mated.

When the top leg 50 and bottom leg 45 are engaged to one another, the top leg 50 may be rotated in a counter-clockwise fashion relative to the bottom leg 45. Or, alternatively, the bottom leg 45 may be rotated in a clockwise direction relative to the top leg 50. These actions cause the distal portions 60, 80 of legs 45, 50 to distance from one another. This increase in distance is preferably allows the drying rack 10 to be set up in the manner illustrated in FIG. 1, or the manner illustrated in FIG. 12, described below. When the joint members 70, 75 move relative to one another in one of the aforementioned manners, the peaks 175 of the joint member 75 are able to slide without resistance over the peaks 140 of the joint member 70. As the peaks 175 slide over the peaks 140, the peaks 175 are preferably received by the troughs 145 on the joint member 70. When the peaks 175 are received by the troughs 145, the distal portions 60, 80 of legs 45, 50 are preferably releasably fixed at a distance from one another. The manner in which the joint members 70, 75 are released from one another is described below when describing the lock member 115 and its function.

Turning now to FIG. 6, an interior side 185 of the joint member 85 taken across line 6-6 of FIG. 3 is shown in greater detail. The interior side 185 preferably includes the aperture 110 that receives the screw 90 after it has been received by the apertures 95, 155. The interior side 185 of the joint member 185 may also include two stopper members 190 that project outwardly from the interior side 185. The stopper members 190 are preferably 180° from one another, and they limit the rotation of the lock member 115, as will be described below.

Figure 7:
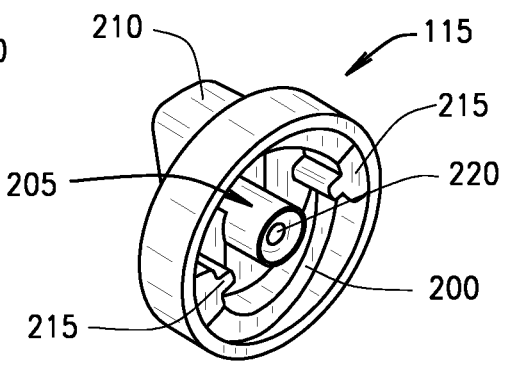
FIG. 7 is a perspective view of a lock member of FIG. 3.

The interior side 185 may also include a thread member 195 for selective engagement with a thread member 200 of the lock member 115 (see FIG. 7). The lock member 115 preferably includes the thread member 200 on an interior side 205 that is configured for selective mating with the thread member 195. When a knob portion 210 of the lock member 115 is rotated clockwise, the lock member 115 preferably applies a tension on the joint member 75, which preferably applies a tension on the joint member 70. This tension preferably ensures that the aforementioned peaks 175 remain engaged in the troughs 145. This tension acts as a locking mechanism to keep the legs 45, 50 at a chosen angle relative to one another, preferably between 0° and 180°, as described below.

The interior side 205 of the lock member 115 preferably further includes T-shaped stopper members 215 that project outwardly from the interior side 205. The stopper members 215 are preferably placed 180° apart from one another. The stopper members 215 and 190 preferably act to prevent the distal portions 60, 80 of legs 45, 50 from overextending relative to one another. The stopper members 215 and 190 preferably maintain the legs 45, 50 between 0° and 180° relative to one another by abutting one another at the 0° and 180° positions. A screw receiver 220 on the interior side 210 of the lock member preferably receives and secures the screw 95 so that the legs 45, 50 and the lock member 115 remain secured to one another.

When a user wishes to release the peaks 175 from the troughs 145, he or she may unscrew the lock member 115 from the joint member 75. More particularly, the thread member 200 of the lock member 115 may be turned counterclockwise relative to the thread member 195 of the joint member 75. With the lock member 115 unscrewed relative to the joint member 75, the spring 105 may exert an outward tension on the joint member 75 such that it is pushed inwardly away from the joint member 70. This tension also pushes the peaks 175 on the top leg 50 inwardly away from the troughs 145 on the bottom leg 45. With the peaks 175 and the bottom leg 45 separated from one another, the left frame 20 may be collapsed. As set forth below, the right frame 15 may similarly be collapsed. The lock member 115 may then be turned again (clockwise in the illustrated embodiment) to lock the left frame 20 in its collapsed form by re-engaging the peaks 175 and troughs 145.

Figure 8A:
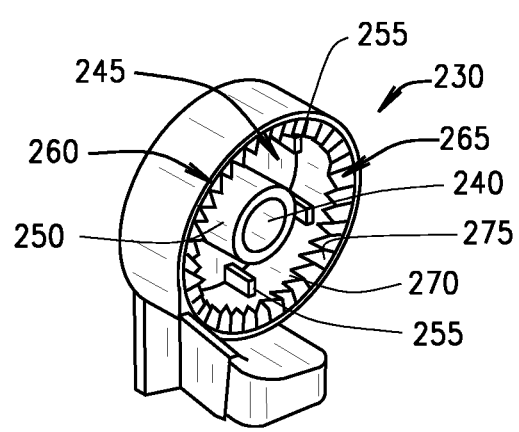
FIG. 8A is an enlarged view of a portion of the right top leg of FIG. 8 taken across line 8A-8A.
Figure 8:
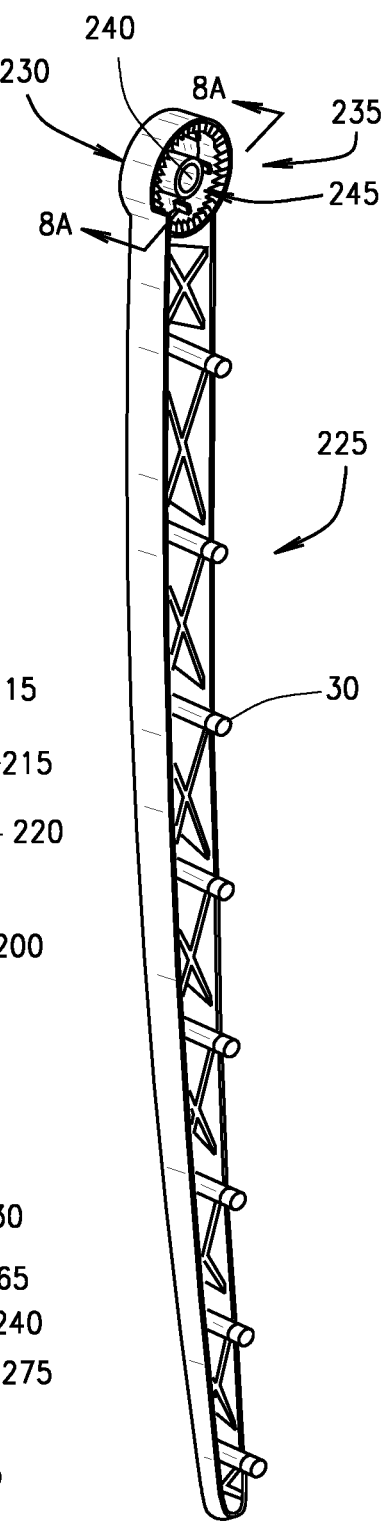
FIG. 8 is a perspective view of an inner portion of a right top leg.

A right top leg 225 of the right frame 15 is shown in FIG. 8. Like the top leg 50, the leg 225 preferably includes the projections 30 that project inwardly therefrom for receiving and securing the crossbars 25 (not shown in FIG. 8). Unlike the top leg 50, however, the leg 225 is positioned exterior to the bottom leg of the right frame 15 (shown in FIG. 9 and described below). Thus a joint member 230 located at a proximal portion 235 of the leg 225 may be substantially similar to the joint member 70 of the bottom leg 45 (that is similarly exterior to the top leg 50). Thus, the joint member 230 may include an aperture 240 at an interior side 245 that is substantially similar to the aperture 95.

Turning now to FIG. 8A, the interior side 245 of the joint member 230 is illustrated in greater detail. Like the joint member 70, the joint member 230 may include a substantially cylindrical member 250 that surrounds the aperture 240 to form the aperture 240. The cylindrical member 250 is preferably similar in form and function to the cylindrical member 120. To retain a spring similar to spring 105 (not illustrated) in a specific location relative to the cylindrical member 250, the interior side 245 of the joint member 230 also preferably includes several projection members 255 that extend outwardly from the interior side 245. In the illustrated embodiment, three of six projection members 255 are shown, but in alternative embodiments more or fewer projection members 255 may be provided. The projection members 255 are preferably substantially similar to the projection members 125 and perform the same function as the projection members 125.

An outer circumference 260 of the interior side 245 of the joint member 230 also preferably includes a plurality of tooth members 265 substantially similar to the tooth members 135 that circumscribe the outer circumference 260. Thus, each tooth member 265 preferably includes each of a peak 270 and a trough 275.

Like the legs 45, 50 may be engaged to one another, the leg 225 may be engaged to a bottom leg 280, shown in FIG. 9. The bottom leg 280 may include a joint member 285 at a proximal portion 290 and feet 295 at a distal portion 300 substantially similar to feet 55. An exterior side 305 of the joint member 285 is illustrated in FIG. 9A. Like the exterior side 150 of the joint member 75, the exterior side 305 of the joint member 285 is preferably configured to mate with the interior side 245 of the joint member 230. Thus, the exterior side 305 also includes an aperture 310 defined by a cylindrical member 315 that surrounds the aperture 310. The cylindrical member 315 also preferably has a circumference just larger than the circumference of the cylindrical member 250 so that when the joint members 230, 285 are mated with one another, the cylindrical member 250 is preferably "nested" within the cylindrical member 315 in a friction fit. As would be clear to one skilled in the art, a screw for attaching the legs 225, 280 to one another (not shown) may enter the aperture 310 after exiting the aperture 240 and before exiting an aperture (shown in FIGS. 10, 10A) on the opposite side of the joint member 285.

An outer circumference 320 of the exterior side 305 of the joint member 285 also preferably includes a plurality of tooth members 325. Like the tooth members 265, each tooth member 325 preferably includes each of a peak 330 and a trough 335. The peaks 330 and troughs 335 are substantially similar to the peaks 270 and troughs 275 of the tooth members 135. Like the peaks 140 and 175, the peaks 270 and 330 face substantially opposite directions from one another when the joint members 230, 285 are mated. The peaks 330 are preferably engageable with the troughs 275 in a manner substantially similar to the peaks 175 that are received by the troughs 145.

FIG. 10 illustrates an interior side 340 of the bottom leg 280, and FIG. 10A shows the interior side 340 of the joint member 285 taken across line 10A-10A. The interior side 340 preferably includes an aperture 345 that receives a screw (not shown) after it has been received by the apertures 240, 310. The interior side 340 of the joint member 285 may also include two stopper members 350 similar to the stopper members 190 that project outwardly from the interior side 340. The stopper members 350 also are preferably 180° from one another, and they limit the rotation of a lock member (and the legs 225, 280) substantially similar to the lock member 115.

The interior side 340 may also include a thread member 355 for selective engagement with a thread member similar to the thread member 200 of the lock member 115 (see FIG. 7). The manner in which the lock member mates with the thread member 355 is substantially similar to the manner in which the lock member 115 selective mates with the thread member 195. Like with the left frame 20 described above, when the lock member is rotated clockwise, the lock member preferably applies a tension on the joint member 285, which preferably applies a tension on the joint member 230. This tension preferably ensures that the aforementioned peaks 330 remain engaged in the troughs 275. This tension acts as a locking mechanism to keep the legs 225, 280 at a chosen angle relative to one another, preferably between 0° and 180°, like the legs 45, 50.

When a user wishes to release the peaks 330 from the troughs 275, he or she may unscrew the lock member from the joint member 285. More particularly, the thread member of the lock member may be turned counterclockwise relative to the thread member 355 of the joint member 285 in a manner substantially similar to the manner in which the lock member 115 is unscrewed from the joint member 75. Tension from the spring (not illustrated) associated with the right frame 15 preferably pushes the peaks 330 on the bottom leg 280 inwardly away from the troughs 275 on the top leg 225. Thus, the right frame 15 may be collapsed. When each of the frames 15, 20 are collapsed in the manner described, the entire drying rack 10 may be collapsed in the manner illustrated in FIG. 11. With the drying rack 10 in this compact form, the drying rack 10 may be stored in small spaces like closets, storage spaces, or between appliances like a washer and dryer.

On the other hand, FIG. 12 illustrates the drying rack 10 in a fully extended position. This position is attainable by rotating the legs 45, 50 and 225, 280 relative to one another. Because the feet 55 of the bottom legs 45, 280 preferably provide some degree of stability, the drying rack 10 may be self-supporting such that it can stand alone. Alternatively, the distal portions of the top legs 50, 225 may rest against a wall to add stability. With the drying rack 10 fully deployed as shown in FIG. 12, the drying rack 10 also preferably takes up only a small amount of floor space while performing its intended function of drying garments draped on its crossbars 25.

An alternative embodiment of the drying rack 10 is provided in FIG. 13. In the embodiment shown in FIG. 13, the crossbars 25 have been replaced with telescoping crossbars 360. The telescoping crossbars preferably include each of a first cylinder member 365 and a second cylinder member 370. The first cylinder member 365 preferably has a circumference slightly greater than the circumference of the second cylinder member 370. As such, the second cylinder member 370 can preferably slide within the first cylinder member 365, thus creating a telescoping mechanism known and understood in the art. The telescoping mechanism allows the telescoping crossbars 360 to increase their length depending on the size of the load to be dried. However, the crossbars 360 can also be shortened when the drying rack is not in use and is going to be stored.

Thus, there has been shown and described a garment drying rack for placing garments thereon that are air-dried. As is evident from the foregoing description, certain aspects of the present inventions are not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. All such changes, modifications, variations and other uses in applications which do not depart from the spirit and scope of the present inventions are deemed to be covered by the inventions which are limited only by the claims which follow.

The invention claimed is:

1. A drying rack for drying wet garments, the drying rack comprising:
   a left frame comprising a top leg and a bottom leg;
   a right frame comprising a top leg and a bottom leg;
   a plurality of crossbars that attach the left frame top leg to the right frame top leg;
   a plurality of crossbars that attach the left frame bottom leg to the right frame bottom leg;
   a joint member at a proximal portion of each of the top legs and the bottom legs;
   wherein the top and bottom legs have projections and the crossbars have an aperture to receive a left frame projection and an aperture to receive a right frame projection, allowing the crossbars to be releasably attached to the legs; and
   wherein each joint member is used to attach the top leg of the left frame to the bottom leg of the left frame and the top leg of the right frame to the bottom leg of the right frame; a first lock member coupled to one of the joint members of the top leg or the bottom leg in the left frame; and
   a second lock member coupled to one of the joint members of the top leg or the bottom leg in the right frame.

2. The drying rack of claim 1, wherein the joint members each include teeth members located around a circumference of the joint members to engage the joint members of the top legs to the joint members of the bottom legs.

3. The drying rack of claim 1, wherein a spring is provided between the joint members of the top legs and the joint members of the bottom legs.

4. The drying rack of claim 1, wherein at least one of the joint members of each of the left frame and the right frame includes a thread member.

5. The drying rack of claim 4, wherein the first lock member and the second lock member each include a thread member.

6. The drying rack of claim 5, wherein the thread member of the at least one of the joint members of each of the left frame and the right frame and the thread member of the first lock member and the second lock member, respectively, are engageable with one another.

7. The drying rack of claim 1, wherein the bottom leg and the top leg of each of the left and right frames have an angle of rotation that is between 0° and 180°.

8. The drying rack of claim 1, wherein at least one of the joint members of each of the left frame and the right frame includes at least one stopper member, and the first lock member and the second lock member each include at least one stopper member.

9. The drying rack of claim 1, wherein the crossbars are telescoping crossbars.

10. The drying rack of claim 1, wherein the bottom legs each include feet located at a distal portion of the bottom legs.

11. A drying rack for drying wet garments, the drying rack comprising:
- a left frame comprising a top leg and a bottom leg, each of the top leg and the bottom leg further including a joint member for attaching the top leg to the bottom leg;
- a right frame comprising a top leg and a bottom leg, each of the top leg and the bottom leg further including a joint member for attaching the top leg to the bottom leg;
- a plurality of crossbars that attach the left frame top leg to the right frame top leg;
- a plurality of crossbars that attach the left frame bottom leg to the right frame bottom leg;
- wherein the top and bottom legs have projections and the crossbars have an aperture to receive a left frame projection and an aperture to receive a right frame projection, allowing the crossbars to be releasably attached to the legs; and
- a first lock member coupled to the joint member of the top or bottom leg in the left frame; and
- a second lock member coupled to the joint member of the other of the top or bottom leg in the right frame.

12. The drying rack of claim 11, wherein the joint members each include teeth members located around a circumference to engage the joint members of the top legs to the joint members of the bottom legs.

13. The drying rack of claim 11, wherein a spring is provided between the joint members of the top legs and the joint members of the bottom legs.

14. The drying rack of claim 11, wherein at least one of the joint members of each of the left frame and the right frame includes a thread member.

15. The drying rack of claim 14, wherein the first lock member and the second lock member each include a thread member.

16. The drying rack of claim 15, wherein the thread member of the at least one of the joint members of each of the left frame and the right frame and the thread member of the first lock member and the second lock member, respectively, are engageable with one another.

17. The drying rack of claim 11, wherein the bottom leg and the top leg of each of the left and right frames have an angle of rotation that is between 0° and 180°.

18. The drying rack of claim 11, wherein at least one of the joint members of each of the left frame and the right frame includes at least one stopper member, and the first lock member and the second lock member each include at least one stopper member.

19. The drying rack of claim 11, wherein the crossbars are telescoping crossbars.

20. The drying rack of claim 11, wherein the bottom legs each include feet located at a distal portion of the bottom legs.

21. A drying rack for drying wet garments, the drying rack comprising:
- a left frame comprising a top leg and a bottom leg, the legs comprising a plurality of projections;
- a right frame comprising a top leg and a bottom leg, the legs comprising a plurality of projections;
- a plurality of crossbars that attach the left frame top leg to the right frame top leg, the crossbars having an aperture to receive a projection of the left frame and an aperture to receive a projection of the right frame, allowing the crossbars to be releasably attached to the legs;
- a plurality of crossbars that attach the left frame bottom leg to the right frame bottom leg, the crossbars having an aperture to receive a projection of the left frame and an aperture to receive a projection of the right frame, allowing the crossbars to be releasably attached to the legs;
- a joint member at a proximal portion of each of the top legs and the bottom legs;
- wherein each joint member is used to attach the top leg of the left frame to the bottom leg of the left frame and the top leg of the right frame to the bottom leg of the right frame; a first lock member coupled to one of the joint members of the top leg or the bottom leg in the left frame; and
- a second lock member coupled to one of the joint members of the top leg or the bottom leg in the right frame;
- wherein the joint members each include teeth members located around a circumference of the joint members to engage the joint members of the top legs to the joint members of the bottom legs; and wherein a spring is provided between the joint members of the top legs and the joint members of the bottom legs.

* * * * *